United States Patent
Meehan

(10) Patent No.: US 9,002,801 B2
(45) Date of Patent: Apr. 7, 2015

(54) SYSTEMS AND/OR METHODS FOR DISTRIBUTED DATA ARCHIVING AMONGST A PLURALITY OF NETWORKED COMPUTING DEVICES

(75) Inventor: Michael C. Meehan, Derbyshire (GB)

(73) Assignee: Software AG, Darmstadt (DE)

( * ) Notice: Subject to any disclaimer, the term of this patent is extended or adjusted under 35 U.S.C. 154(b) by 622 days.

(21) Appl. No.: 12/662,026

(22) Filed: Mar. 29, 2010

(65) Prior Publication Data

US 2011/0238935 A1    Sep. 29, 2011

(51) Int. Cl.
*G06F 17/30* (2006.01)
*G06F 11/14* (2006.01)

(52) U.S. Cl.
CPC ...... *G06F 17/30286* (2013.01); *G06F 11/1469* (2013.01)

(58) Field of Classification Search
CPC .................................. G06F 17/30; G06F 17/00
See application file for complete search history.

(56) References Cited

U.S. PATENT DOCUMENTS

| | | | | | |
|---|---|---|---|---|---|
| 4,405,862 | A | * | 9/1983 | Bricot et al. | 250/318 |
| 4,418,392 | A | * | 11/1983 | Hata | 702/91 |
| 4,567,579 | A | * | 1/1986 | Patel et al. | 365/189.05 |
| 4,825,404 | A | * | 4/1989 | Theus | 710/104 |
| 4,896,350 | A | * | 1/1990 | Bicknell et al. | 379/220.01 |
| 4,931,870 | A | * | 6/1990 | den Hollander | 348/468 |
| 5,003,577 | A | * | 3/1991 | Ertz et al. | 379/88.13 |
| 5,013,981 | A | * | 5/1991 | Rodi | 318/67 |
| 5,027,395 | A | * | 6/1991 | Anderson et al. | 713/176 |
| 5,231,381 | A | * | 7/1993 | Duwaer | 345/174 |
| RE34,529 | E | * | 2/1994 | Bicknell et al. | 379/220.01 |
| 5,301,786 | A | * | 4/1994 | Yoshihara | 194/207 |
| 5,390,286 | A | * | 2/1995 | Ramakrishna | 706/48 |
| 5,402,151 | A | * | 3/1995 | Duwaer | 345/173 |
| 5,485,519 | A | * | 1/1996 | Weiss | 713/185 |
| 5,519,767 | A | * | 5/1996 | O'Horo et al. | 379/67.1 |
| 5,671,451 | A | * | 9/1997 | Takahashi et al. | 396/310 |
| 5,672,837 | A | * | 9/1997 | Setoguchi et al. | 84/609 |
| 5,726,983 | A | * | 3/1998 | Bakke et al. | 370/337 |
| 5,729,275 | A | * | 3/1998 | Nagahata | 347/210 |
| 5,751,805 | A | * | 5/1998 | Otsuki et al. | 705/54 |
| 5,801,998 | A | * | 9/1998 | Choi | 365/193 |
| 5,802,493 | A | * | 9/1998 | Sheflott et al. | 705/1.1 |

(Continued)

OTHER PUBLICATIONS

Olson, Jack, "Long Term Database Archiving," 2006, Neon Enterprise Software, Inc., pp. 1-30.*

(Continued)

*Primary Examiner* — Farhan Syed
(74) *Attorney, Agent, or Firm* — Nixon & Vanderhye PC

(57) ABSTRACT

Certain example embodiments of this invention relate to system and/or methods that pair a data extractor with a data accumulator, wherein these components may be located on any one or more computers in a network system. This distributed peer extract-accumulate approach is advantageous in that it reduces (and sometimes completely eliminates) the need for a "funnel" approach to data archiving, wherein all data is moved or backed up through a central computer or central computer system. In certain example embodiments, recall-accumulate, search, verify, and/or other archive-related activities may be performed in a similar peer-based and/or distributed manner. Certain example embodiments may in addition or in the alternative incorporate techniques for verifying the integrity of data in an archive system, and/or techniques for restoring/importing data from a non-consumable form.

37 Claims, 9 Drawing Sheets

(56) References Cited

U.S. PATENT DOCUMENTS

| | | | |
|---|---|---|---|
| 5,969,633 A * | 10/1999 | Rosler | 340/5.25 |
| 6,064,666 A * | 5/2000 | Willner et al. | 370/352 |
| 6,119,721 A * | 9/2000 | Watanabe et al. | 137/487.5 |
| 6,345,269 B1 | 2/2002 | Kappenberger et al. | |
| 6,550,057 B1 * | 4/2003 | Bowman-Amuah | 717/126 |
| 6,963,875 B2 * | 11/2005 | Moore et al. | 1/1 |
| 7,103,619 B1 * | 9/2006 | Rajpurkar et al. | 1/1 |
| 7,107,285 B2 * | 9/2006 | von Kaenel et al. | 1/1 |
| 7,181,017 B1 * | 2/2007 | Nagel et al. | 380/282 |
| 7,349,915 B1 * | 3/2008 | Moore et al. | 1/1 |
| 7,529,784 B2 * | 5/2009 | Kavuri et al. | 1/1 |
| 7,536,425 B2 * | 5/2009 | Moore et al. | 1/1 |
| 7,539,642 B2 * | 5/2009 | Meehan et al. | 705/37 |
| 7,580,950 B2 * | 8/2009 | Kavuri et al. | 1/1 |
| 7,664,688 B2 * | 2/2010 | Clark et al. | 705/35 |
| 7,689,536 B1 * | 3/2010 | Weissman et al. | 707/999.002 |
| 8,788,504 B1 * | 7/2014 | Zhao et al. | 707/741 |
| 8,843,435 B1 * | 9/2014 | Trefler et al. | 707/600 |
| 8,856,869 B1 * | 10/2014 | Brinskelle | 726/2 |
| 8,862,619 B1 * | 10/2014 | Kariv | 707/771 |
| 2001/0056429 A1 * | 12/2001 | Moore et al. | 707/101 |
| 2002/0120685 A1 * | 8/2002 | Srivastava et al. | 709/203 |
| 2003/0182305 A1 * | 9/2003 | Balva et al. | 707/103 R |
| 2004/0158604 A1 * | 8/2004 | Hepworth et al. | 709/200 |
| 2004/0236666 A1 * | 11/2004 | Clark et al. | 705/37 |
| 2005/0144189 A1 * | 6/2005 | Edwards et al. | 707/102 |
| 2005/0149427 A1 * | 7/2005 | Meehan et al. | 705/37 |
| 2005/0195660 A1 * | 9/2005 | Kavuri et al. | 365/189.05 |
| 2005/0198086 A1 * | 9/2005 | Moore et al. | 707/204 |
| 2005/0226059 A1 * | 10/2005 | Kavuri et al. | 365/189.05 |
| 2007/0038670 A1 * | 2/2007 | Dettori et al. | 707/104.1 |
| 2007/0050340 A1 * | 3/2007 | von Kaenel et al. | 707/3 |
| 2007/0103984 A1 * | 5/2007 | Kavuri et al. | 365/185.17 |
| 2007/0174362 A1 * | 7/2007 | Pham et al. | 707/204 |
| 2008/0168135 A1 * | 7/2008 | Redlich et al. | 709/204 |
| 2008/0256040 A1 * | 10/2008 | Sundaresan et al. | 707/3 |
| 2009/0049014 A1 * | 2/2009 | Steinberg | 707/3 |
| 2009/0064182 A1 * | 3/2009 | Holar et al. | 719/314 |
| 2009/0089254 A1 * | 4/2009 | Von Kaenel et al. | 707/3 |
| 2009/0254572 A1 * | 10/2009 | Redlich et al. | 707/10 |
| 2010/0114941 A1 * | 5/2010 | Von Kaenel et al. | 707/769 |
| 2010/0251262 A1 * | 9/2010 | Rokicki et al. | 719/314 |
| 2010/0333111 A1 * | 12/2010 | Kothamasu et al. | 719/313 |

OTHER PUBLICATIONS

Ludäscher, B., Marciano, R., & Moore, R. (2001). Preservation of digital data with self-validating, self-instantiating knowledge-based archives. ACM Sigmod Record, 30(3), pp. 54-63.*

Ward, J. H., de Torcy, A., Chua, M., & Crabtree, J. (Dec. 2009). Extracting and Ingesting DDI Metadata and Digital Objects from a Data Archive into the iRODS extension of the NARA TPAP using the OAI-PMH. Fifth IEEE International Conference in e-Science '09, pp. 185-192.*

Desai, "Email Archiving—UK Law, Regulations and Implications for Business," MessageLabs, Feb. 2009, pp. 1-10.

Solix, "Solix Database Archiving,," Datasheet, pp. 1-2.

Informatica, "Informatica Data Archive Manage Data Growth While Controlling Costs," Datasheet, pp. 1-2.

Yuhanna, "Database-As-A-Service Explodes on the Scene," Forrester, Jul. 31, 2008 and Aug. 1, 2008, pp. 1-19.

DiCenzo, "Database-Archiving Products are Gaining Market Traction," Research ID No. G00161796, Gartner, Oct. 13, 2008, pp. 1-10.

U.S. Appl. No. 12/458,030, Kothamasu et al., filed Jun. 29, 2009.

U.S. Appl. No. 12/385,104, Rokicki et al., filed Mar. 31, 2009.

U.S. Appl. No. 11/896,310, Holar et al., filed Aug. 30, 2007.

Informatica, "Informatica Data Archive Manage Data Growth While Controlling Costs," Datasheet, pp. 1-2 (Jul. 23, 2009).

Solix, "Solix Database Archiving," Datasheet, pp. 1-2 (at least as early as Mar. 29, 2010).

* cited by examiner

SYSTEMS AND/OR METHODS FOR DISTRIBUTED DATA ARCHIVING AMONGST A PLURALITY OF NETWORKED COMPUTING DEVICES

FIELD OF THE INVENTION

Certain example embodiments of this invention relate to distributed data archiving systems and/or methods. More particularly, certain example embodiments of this invention relate to system and/or methods that pair a data extractor with a data accumulator, wherein these components may be located on any one or more computers in a network system. This distributed peer extract-accumulate approach is advantageous in that it reduces (and sometimes completely eliminates) the need for a "funnel" approach to data archiving, wherein all data is moved or backed up through a central computer or central computer system. In certain example embodiments, recall-accumulate, search, verify, and/or other archive-related activities may be performed in a similar peer-based and/or distributed manner.

BACKGROUND AND SUMMARY OF EXAMPLE EMBODIMENTS OF THE INVENTION

The amount of data in databases and other data stores continues to grow and grow over time. There are many reasons for this continued expansion. One reason relates to the fact there are more and more business transactions taking place every day. Internet, intranet, and/or systems have increased the number of transactions greatly, so too has merger and acquisition activity in many business sectors. The end result is more data needs to be archived in order to, for example, remain compliant with legislation (e.g., that requires maintaining such information), keep the main "production" part of business systems at maximum levels of efficiency, etc. Details regarding transactions including, for example, the parties, terms, conditions, relevant products or data, etc., often are archived. In addition, there recently has been a move towards archiving metadata (which may sometimes be thought of as "data about data") concerning each of these and/or other aspects of a business transaction.

With the need for more archiving of data comes the concomitant need for better ways to accomplish it. For instance, the inventor of the instant application has realized that it would be desirable to archive business and/or other data in a way that allows for central control of the service but, at the same time, maximizes the potential scope for distribution across the network.

Current archiving approaches are not designed to cope with a proliferation of archiving. Present systems typically either funnel through one or only a very few, specific computers in the network. This approach limits capacity and reduces fault tolerance, as there is a "funnel" through which all data must pass. This funnel approach is limited by the resources dedicated to the funnel. It also presents a single point of failure.

A product that once was commercially available from Neon purported to operate in a distributed manner. To an extent, this claim is true. That is, Neon's product involved "extraction" of data is allowed to take place in multiple computers. However, the "accumulation" of this extracted data into the archive had to go through a specific computer that acted as the archive control center. Thus, even though data extraction may have taken place in or at various computers across a network, the system disadvantageously involved a "funnel" through which all extracted data was archived.

FIG. 1 is a simplified view of network system that helps demonstrate certain disadvantages of the funneling approach to data archiving. The network 100 in FIG. 1 includes a plurality of computers 102. Each computer is connected to a data store 104. A computer 102 is configured to extract data from an associated data store 104, and then send all or part of it to an accumulator computer 106 which, in turn, archives the extracted data in the archive storage location 108. As can be seen from the FIG. 1 example, all data is funneled through the accumulator 106 before it can be stored to the archive storage location 108. Thus, if anything happens to the accumulator 106 (e.g., it is damaged, destroyed, temporarily inaccessible, etc.), the archiving operation will fail. As such, even though the extraction of data may be somewhat distributed, the central funnel provided by the accumulator 106 is still disadvantageous.

Thus, it will be appreciated that there is a need in the art for improved archiving systems and/or methods. For example, it will be appreciated that there is a need in the art for truly distributed approaches to both data extraction and data accumulation.

One aspect of certain example embodiments involves archiving of data in a way that allows for central control of the service but, at the same time, maximizes the potential scope for distribution across the network. According to certain example embodiments, any number of data "extractors" may be running on any number and/or type of computers. At the same time, according to certain example embodiments, any number of data "accumulators" may be running on any number of computers. The accumulator computers may be the same or different computers as the extractor computers. In certain example embodiments, some (but not all) of the accumulators computers may also be extractor computers, and vice versa. The distributed design disclosed herein advantageously increases capacity and improves fault tolerance.

Another aspect of certain example embodiments relates to techniques for automatically determining whether data has been lost or damaged. In such cases, data integrity checks may be performed along with, or in place of, security-enhancing encryption-based techniques. An example scenario is that archive data is stored for a very long time but generally is untouched. Accordingly, an incident may occur, e.g., at the hardware level, where storage media is lost—even though relevant personnel (e.g., an information technology department, data owner, etc.) are not informed, there is no apparent loss, and/or no apparent interruption to service. Some amount of time later (e.g., days, months, or years), a search of the archive may need to access what was lost. Unfortunately, because so much time has passed since the incident, there now may be no chance to correct the problem. However, using the techniques of certain example embodiments, it may be possible to help ensure that all parts of the archive are regularly accessed (to varying degrees) within a controlled amount of time. This example approach may, in turn, improve the ability to identify, address, and rectify any loss, as discovery of the problem may be closer to the time when the incident occurs.

Certain example embodiments of this invention relate to an archival system. A plurality of computers is connected to a network. At least one source data store and at least one target data store are connected to the network. At least one archive service is configured to coordinate a plurality of extract operations and a plurality of accumulate operations, with each said extract operation being executed on one said computer in the plurality of computers to read data from one said source data store and with each said accumulate operation being executed on one said computer in the plurality of computers to write data to one said target data store. Each said extract operation is configured to run on any one predetermined computer in the plurality of computers and is paired with one said accumulate operation that is configured to run on any one predetermined computer in the plurality of computers.

In certain example embodiments, the at least one archive service may be further configured to access rules (a) mapping the extract and accumulate operations to respective computers on which the operations are to be executed, and (b) storing pairings between peer extract and accumulate operations. In certain example embodiments, the rules may further identify at least one said source data store for each said extract operation and at least one said target data store for each said accumulate operation. In certain example embodiments, the rules may further include extract rules identifying data to be read from the at least one source data store and whether any further data is to be attached to the data to be read, and/or accumulate rules indicating how duplicate entries are to be handled and/or how long data is to be retained in each said target data store.

The system of certain example embodiments may be arranged such that a central hub or funnel is not used when data is written to the at least one target data store.

According to certain example embodiments, the at least one archive service may be further configured to coordinate at least one recall operation to retrieve data from the at least one target data store for access on one said computer. In the at least one recall operation, the retrieved data from the at least one target data store may be placed into at least one said source data store.

According to certain example embodiments, the at least one archive service may be further configured to coordinate at least one validation operation to verify integrity of data in the at least one target data store. The at least one validation operation may run continuously for a predetermined amount of time, periodically such that the at least one validation operation begins execution at predetermined times or time intervals, etc. The at least one validation operation may be configured to determine whether data exists, matches a checksum, and/or is recallable, based on predetermined rules accessible by the at least one validation operation. The at least one validation operation may be further configured to raise an alarm if the at least one validation operation encounters a fault during execution.

According to certain example embodiments, the at least one archive service may be further configured to coordinate at least one importing operation to incorporate data from an otherwise non-consumable backup location into the at least one source data store and/or the at least one target data store. The at least one importing operation may be configured to determine (a) what data exists in the data from the otherwise non-consumable backup location was backed up, and (b) how the data from the otherwise non-consumable backup location was backed up. The at least one importing operation may implement rules for reacquiring the data from the otherwise non-consumable backup location, with the rules for reacquiring the data being one or more user programmed rules, one or more predefined algorithms, and/or automatically generated by the at least one importing operation.

In certain example embodiments of this invention, corresponding methods for providing, configuring, and/or executing the same also may be provided.

In certain example embodiments of this invention, corresponding computer readable storage media tangibly storing instructions for executing such methods also may be provided.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
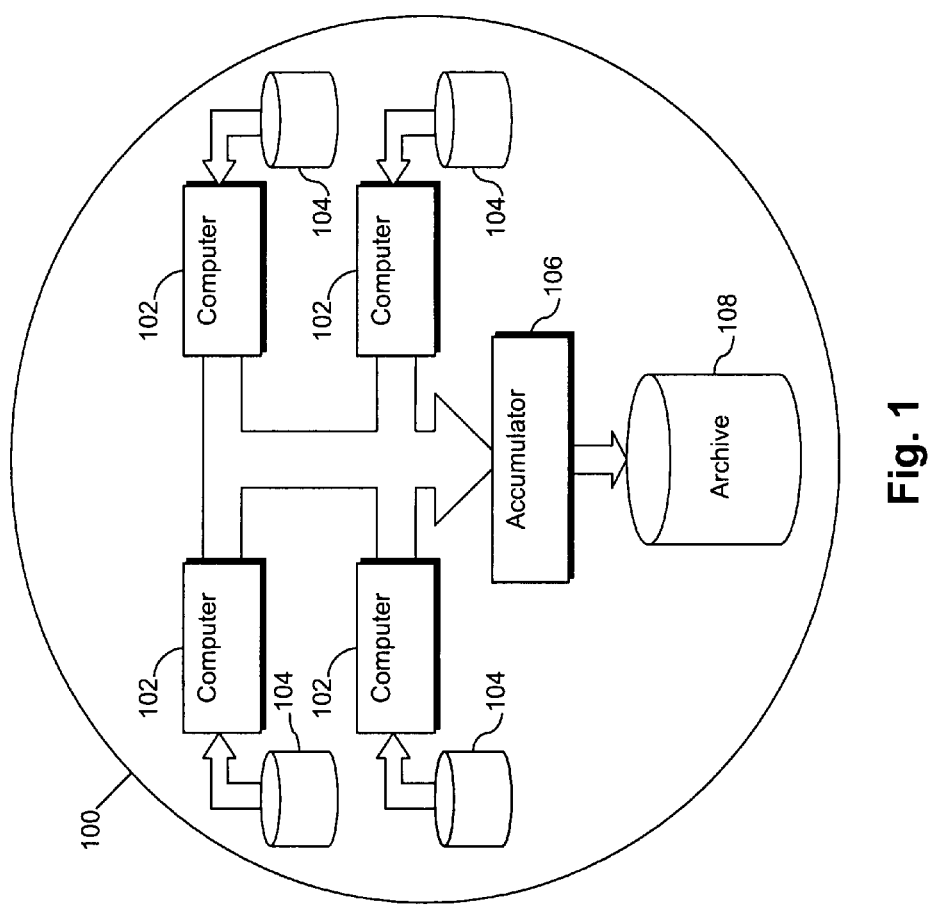
FIG. 1 is a simplified view of network system that helps demonstrate certain disadvantages of the funneling approach to data archiving.

In certain example embodiments, it is possible to have any number of automated archive operations running in parallel across the enterprise network. This distributed processing model advantageously allows parallel operations within computers and across computers, simultaneously, so there is no (or substantially no) practical limit to the number of archiving operations that may take place. For example, there may be many computers within a business. Each of these computers may be available to be used to extract data from the origin database or other origin data store for archiving and/or be configured to accumulate data into the archive.

By allowing unlimited or substantially unlimited parallel activity, the processing of archive operations may be spread across the entire network instead of being funneled into and through a small part of the network. This distribution raises the throughput capacity of archiving operations. This approach also allows archive processing to be directed at computers where processing costs are lower, or where processing capacity is greater. This decision may be based on the needs of each individual archive operation. For instance, legal requirements are attached to the archiving of personal financial transactions including, for example, when the archiving is to take place, how long the retention is to last, etc. These legal requirements therefore may comparatively elevate the importance of such data, and archiving operations for such data may be given high priority so that they will be set to execute on higher-speed computers. Conversely, data relating to internal stock levels has comparatively lower legal requirements associated with it and, as such, it may be less critical, implying that archiving operations may be set to execute on less expensive, slower computers. In addition, it implies that archiving processing overheads can be directed at parts of the network that have the capacity do it, along with the cost efficiency.

As an example, one customer of the instant assignee runs approximately 60,000 servers in addition to its mainframes. If one or more "extractors" are scheduled to run on each of those computers, and all of the peer-related "accumulators" are funneled through one specific computer that "centrally owns" (or has permission to operate on) the archive, the archiving situation becomes unviable. There simply are too many incoming connections that funnel too much data to the specific computer that centrally owns the archive. By contrast, certain example embodiments involve an approach that reduces and sometimes even completely eliminates the need for a funnel. In so doing, certain example embodiments enable as many activities as are necessary to occur simultaneously or substantially simultaneously without the potential bottleneck of the funnel. Indeed, in certain example embodiments, rather than the funnel computer imposing bottlenecks and/or limiting throughput, the storage vault itself may provide the practical processing limits. This may help to ensure that the storage vault system is used to the maximum extent possible or ultimately desirable.

Figure 2:
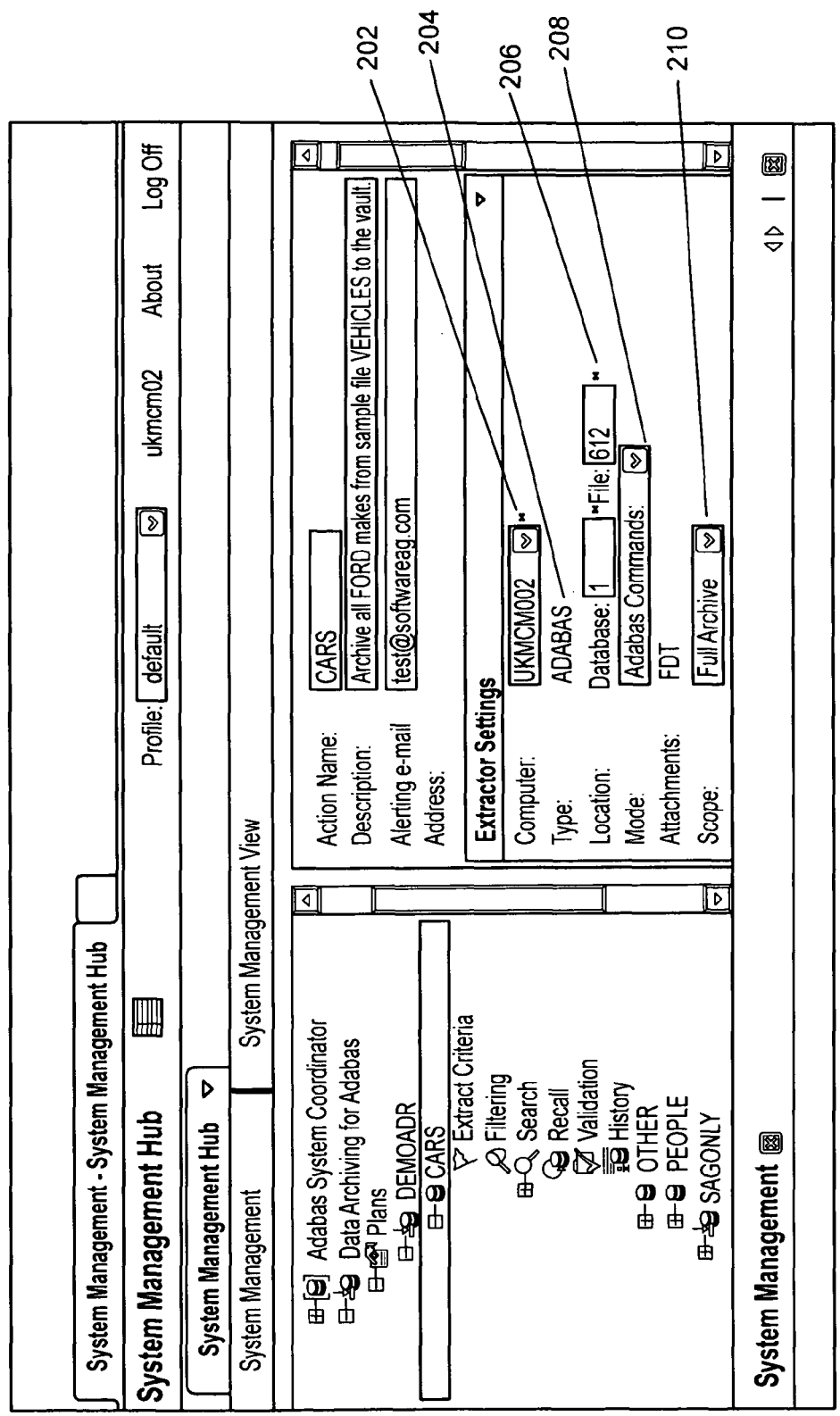
FIG. 2 is an illustrative screenshot showing certain parameters that may be involved in an extract operation in connection with certain example embodiments.

As alluded to above, the archiving processes described herein may be thought of as involving a peer-based extract and accumulate operation. FIG. 2 is an illustrative screenshot showing certain parameters that may be involved in an extract operation in connection with certain example embodiments. An extract computer may be designated, e.g., from a drop-down list 202 including all eligible computers configured to perform the extract operation. In the FIG. 2 example, the computer designated "UKMCM002" is selected to be the extracting computer. The type of store being accessed is identified in area 204 as being an ADABAS database. Of course, it will be appreciated that the techniques described herein may be used in connection with any kind of database or data store and that ADABAS is only one example of a suitable database. In any event, the location of the ADABAS database and/or information to be extracted therefrom is provided in the location area 206. In the FIG. 2 example, location area 206 indicates that database number 1 is to be accessed at file 612. The mode of access area 208 specifies the way in which the data is to be obtained. In the FIG. 2 example, ADABAS commands are to be used to access the data. Other options are, of course, possible. For instance, the raw file may be simply copied in whole or in part, SQL commands may be executed, etc. The scope of the archive operation is specified in area 210. In the FIG. 2 example, the scope involved is a full archive. Of course, other options may include, for example, selected data such as pre-designated key or important data, data that has recently changed, data that has changed since the last archive operation, data needed to comply with a pre-defined rule or requirement (e.g., a legal reporting requirement, etc.), and/or the like. All data may be considered eligible for archiving in certain example embodiments, with the choice of which data to archive being left to the enterprise itself. Some data may have specific compliance requirements associated with it, which may essentially prescribe archiving activities. However, the inventor of the instant application has observed that most enterprises would like to archive far more information than their current loads. In this regard, the inventor of the instant application also has identified that the barrier often pertains to the ease with which archiving may be performed. In any event, example technical data types for archiving may include, for example, normal text data, binary, packed, numeric, floating point, etc. In addition to the business data, it may also be desirable to archive metadata (e.g., systems data that describes the business data), as well. For example, in the ADABAS example, each file has a description schema called the FDT (field description table), and it may be desirable in certain instances for the FDT (or its equivalent in other types of databases or data stores) to be archived, as well. Indeed, such metadata often is required to allow the system to correctly manipulate and marshal business data now and into the future.

Figure 3:
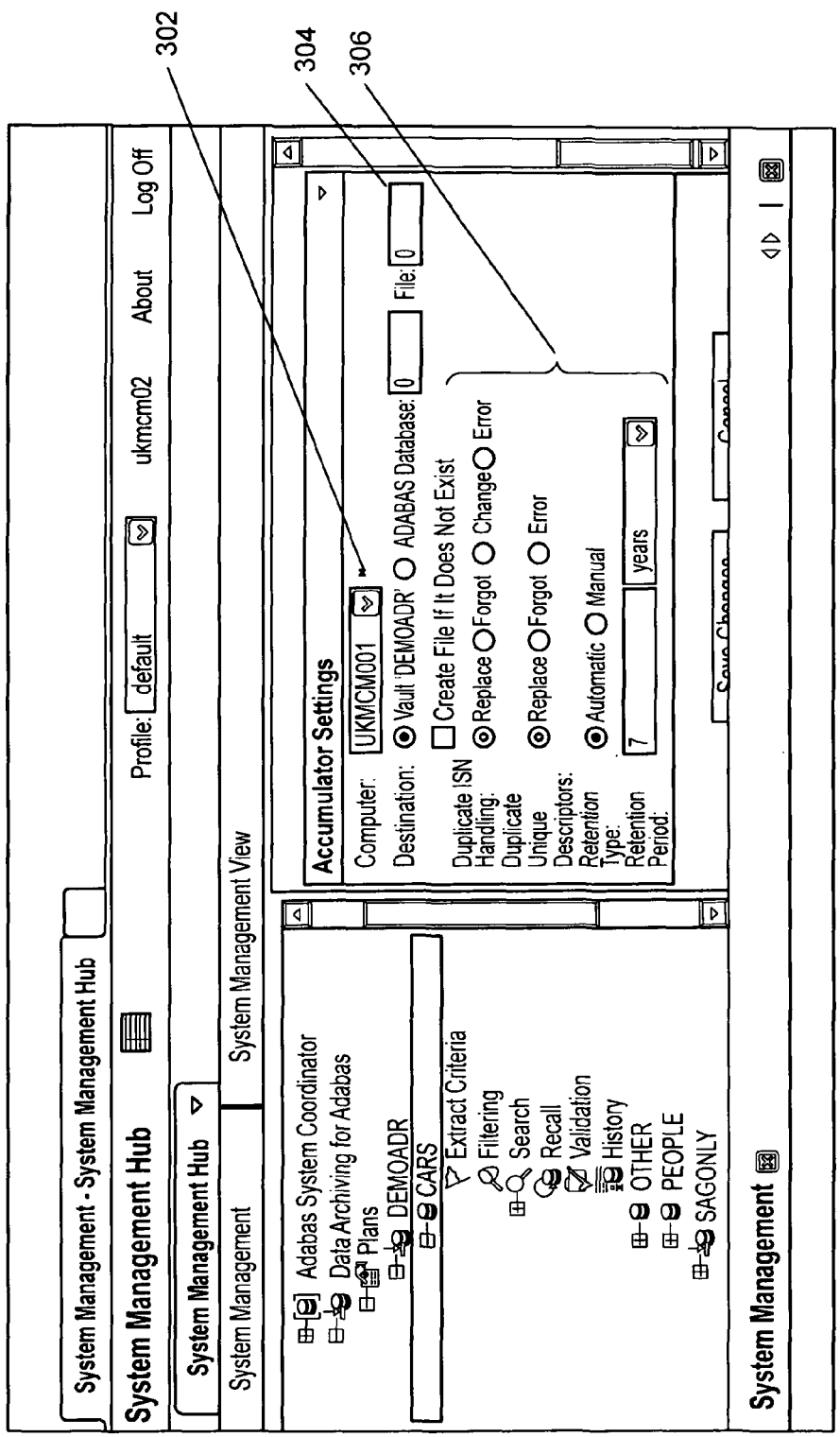
FIG. 3 is an illustrative screenshot showing certain parameters that may be involved in an accumulate operation in connection with certain example embodiments.

Similarly, the accumulate part of an archive operation may be configured to operate on any computer in the network, which may be the same computer as or a different from its peer or partner extract operation. In this regard, FIG. 3 is an illustrative screenshot showing certain parameters that may be involved in an accumulate operation in connection with certain example embodiments. In the FIG. 3 example, the accumulate computer 302 is "UKMCM001," which is a different computer than its peer extractor (identified above as "UKMCM002"). The accumulation destination of the extracted data may be specified using destination options 304. As alluded to above, the extracted data may be accumulated into a vault (also sometimes referred to as an archive storage location or simply an archive). In certain example embodiments, the vault may be a centrally located storage area accessible to all or substantially all computers. In other words, the vault essentially may be part of the network backbone. In certain example embodiments, the data stored to the vault may be stored in flat files, e.g., in a file system or directory structure like arrangement. In certain example embodiments, the extracted data may be alternatively or additionally stored to another peer database or data store (e.g., another ADABAS database, a different type database, or other store that may be the same type as or a different type of the data store from which the data is extracted). For instance, in the FIG. 3 example, a specific ADABAS database and/or storage location may be (but is not) selected. The vault may in certain example instances comprise one or more physical storage locations and, in this way, a single vault may even be said to contain multiple vaults or sub-vaults. In certain example embodiments, the vault may be a form of secure repository that takes on any suitable physical and/or logical form.

Data store parameters 306 also may be specified. Such parameters may include whether files are to be created if they do not already exist, how duplicate entries are to be handled (e.g., replaced, ignored, changed, error messages to be generated, etc.), how duplicate data descriptions are to be handled (e.g., using the above and/or other options), etc. Details regarding the retention type also may be specified such that, for example, automatic or manual retention policies are implemented. Automatic retention policies may involve, for example, retaining data for a predefined amount of time, what types of data are to be retained, when and/or how backups are to be performed or purged, etc.

Figure 4:
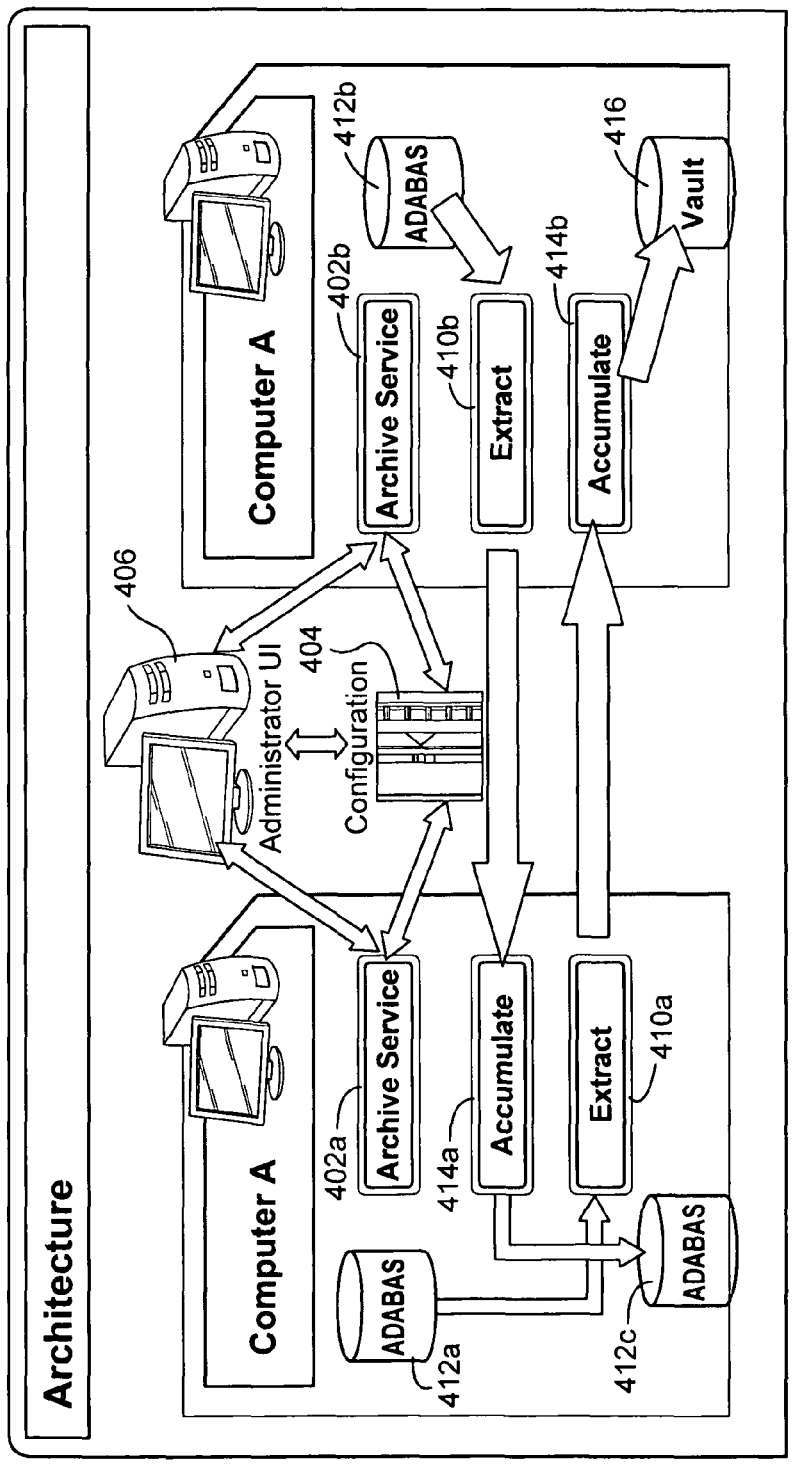
FIG. 4 is an example system-level view of showing extract and accumulate processes running in accordance with an example embodiment.

Any number of these process pairs can be running at any time, in any combination across the entire network, without practical limit. In certain example embodiments, multiple operations may run within one computer and across multiple computers simultaneously. FIG. 4 is an example system-level view of showing extract and accumulate processes running in accordance with an example embodiment. More particularly, in the FIG. 4 example, two extract/accumulate pairs are running in opposing direction across the same two computers. More particularly, Computers A and B include respective instances of the archive service 402a and 402b, respectively. The archive service 402 coordinates the extract and accumulate operations (described in greater detail below), based on settings contained in the configuration server 404. The configuration sever may include the rules of archiving, e.g., as established by the parameters provided by way of the illustrative screenshots of FIGS. 2 and 3 described above. In this regard, an Administrative user interface 406 may allow a user to observe the archiving process and/or adjust the configuration rules.

In any event, as indicated above, the archive service may essentially control or coordinate the extract and accumulate activities. In the FIG. 4 example, Computer A launches an extract operation 410a. This extract operation 410a retrieves data from the ADABAS database 412a, e.g., in accordance with the specified rules. The extract operation 410a of Computer A is paired with a peer accumulate process 414b that is executed on Computer B. The accumulate process 414b then takes the data extracted from ADABAS database 412a and places it in the vault 416. As indicated above, the vault may be a central data store (e.g., implemented in a file system), even though it is shown on the Computer B side of FIG. 4.

Also as indicated above, selected data may be accumulated into another data store instead of, or in addition to, a usual vault or archive. As shown in FIG. 4, the ADABAS database 412b is archived to the ADABAS database 412c. This is accomplished in the FIG. 4 example by deploying an extract operation 410b on the Computer B side and pairing it with an accumulate operation 414a on the Computer A side. In other words, the extract operation 410b retrieves data from ADABAS database 412b and then sends it to accumulate operation 414a so that it can be archived to the ADABAS database 414a.

In certain example embodiments, the communications (e.g., between extract and accumulate operations) may be routed over TCP/IP communications. Of course, other communications protocols also are possible. For instance, another example transport that may be used in connection with certain example embodiments is a broker-based transport. See, for example, U.S. application Ser. Nos. 12/458,030; 12/385,104; and 11/896,310, the entire contents of which are hereby incorporated herein in their entireties. The commercially available EntireX product also may be used as a transport in certain example embodiments. In certain example embodiments, the accumulate and extract operations may be performed on computer "close" to their respective source and destination databases, although other arrangements are possible in different embodiments of this invention. In addition, in certain example embodiments, where the extract and accumulate operations for a particular archive activity are set to execute in the same computer, these components may be combined into one, thereby reducing (and sometimes even eliminated) the need for routed communications.

The FIG. 4 example architecture provides the freedom to deploy archive operations across the whole enterprise network. This, combined with automatic execution (e.g., according to pre-defined regular or irregular schedules), implies that archiving may operate seamlessly for the whole business as a professionally managed corporate service.

Figure 5:
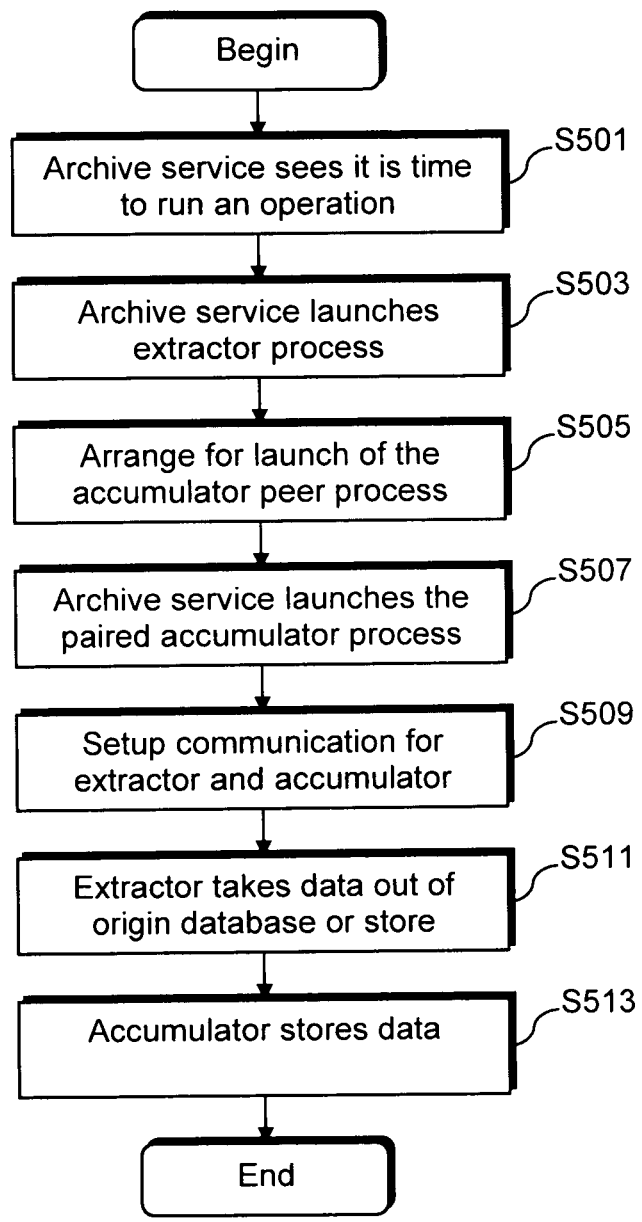
FIG. 5 is a flowchart showing an illustrative process for performing an archive operation in accordance with an example embodiment.

FIG. 5 is a flowchart showing an illustrative process for performing an archive operation in accordance with an example embodiment. In step S501, the archive service deployed in the extract computer sees that it is time to run a particular operation, e.g., according to preset schedules. The archive service may detect this on its own, or it may be instructed to perform an archive operation, e.g., by a configuration server, in different embodiments of this invention. In step S503, the archive service then launches an extractor process on the appropriate computer. The archive service then recognizes the paired accumulator process that is to run (e.g., on the same or another computer) in step S505. It accordingly communicates with the archive service in the appropriate computer to arrange for the launch of the accumulator peer. The archive service in the appropriate computer launches the paired accumulator process locally to itself in step S507. The extractor and accumulator processes are awarded communication ports so they can work together to get through the process in step S509. In step S511, the extractor takes information out of the origin database or store according to the criteria defined. In certain example embodiments, the extractor may block up "n" records into one communication over to the accumulator peer. The paired accumulator stores the latest "block" into the chosen destination in step S513. The storing of the latest block also may be confirmed to the extractor and/or archive service. In certain example embodiments, the block may be removed from the origin source. The extractor may then get the next block, and so on until all data is extracted, stored, and removed from the origin database or source. During this process, both the extractor and accumulator processes may provide progress information to their local archive services. The administrator may use the UI to watch the processing in either of the two computers with graphical display of progress-to-date.

Figure 6:
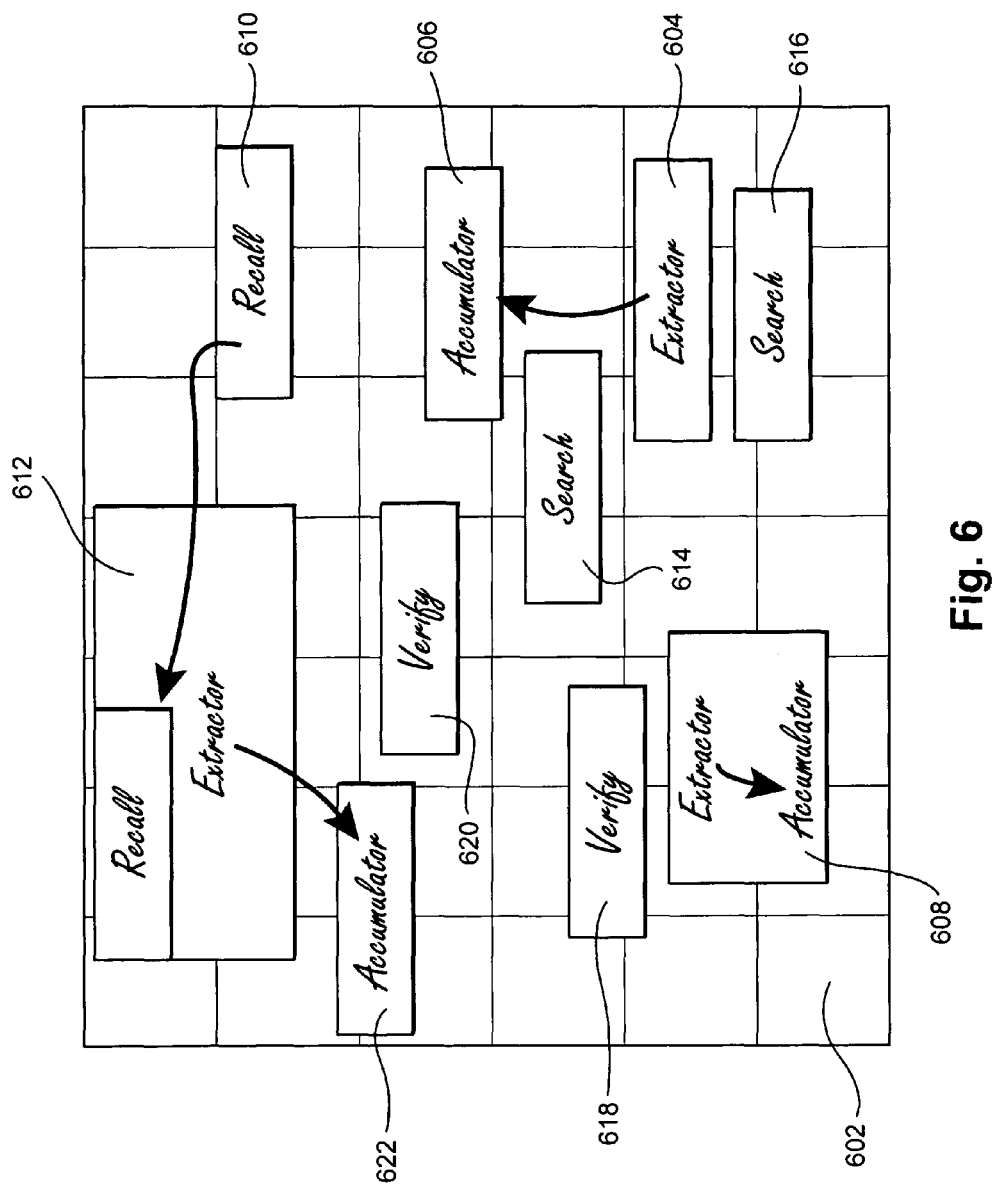
FIG. 6 is an illustrative view a system including multiple distributed archive-related activities in accordance with an example embodiment.

Archive activities are not limited to just extraction and accumulation. For example, other archive activities pertain to search, verify, recall, and/or other operations. These operations also may be configured to run anywhere in the network, e.g., so that such activities are provided in a distributed manner. FIG. 6 is an illustrative view a system including multiple distributed archive-related activities in accordance with an example embodiment. The FIG. 6 example system includes extract, accumulate, search, verify, and recall components. Of course, it will be appreciated that other components also may be provided to the system in place of, or in addition to, these example components. It also will be appreciated that certain components may be provided in the context of one or more computers, and the boxes in FIG. 6 are merely illustrative of certain example embodiments of this invention.

Referring to FIG. 6 in more detail, the background grid 602 represents the storage media (e.g., example disk space) network. This is shown as an all-encompassing storage grid in the FIG. 6 example. The grid signifies that although it sometimes may be feasible for all computers to use all parts of the storage network, it often may be compartmentalized so that each computer sees only what it needs to see. This arrangement is normal of some security policies in enterprises. This example arrangement also may imply that multiple logical archives or vaults may be used in parallel in certain example embodiments, e.g., for different business areas within the same company (or even different companies sharing the same computer/storage network). Of course, it will be appreciated that there is no real fixed schematic view that encapsulates all possible system archive arrangements, as the various components may vary, just as companies manage storage networks in the same way. This flexibility implies that the parallel, distributed nature of archiving leveraged in certain example embodiments may be enhanced by having a parallel distributed network of archives or vaults, e.g., for differing purposes and/or data, e.g., within the same computer network. Often, all or most of this media is shared by all or most computers in the network. The grid 602 represents the varied nature of this sharing across the enterprise. In some example implementations, all computers in the network can see one part of this grid 602, but another part of the grid 602 can only be seen by a subset. This type of variation is typical of many network systems. This grid 602 depiction can be taken to the extreme where one block of the grid might represent the local disk of a computer, available to no others.

The other boxes in the diagram are strewn over the storage grid 602 in a seemingly irregular way. In reality, there oftentimes is a good reason for where each computer sits within the network but, to an innocent bystander, this is not always apparent. The worded boxes each represent a computer in the enterprise network, with each having access to some (or all) of the storage grid 602. Enterprises sometimes have tens of thousands of server computers across the globe, but to depict such networks is too difficult to do simply and clearly. Accordingly, the FIG. 6 example may be thought of as being merely a small piece of a larger exemplary enterprise.

The words in each box representing a computer show at a random point in time an archive-related activity that may be occurring. Arrows connect certain paired activities (e.g., extract and accumulate) that are required to archive data. For example, computer 604 is paired with computer 606 for extract and accumulate purposes, respectively. Both computers 604 and 606 may be able to access the archive within the storage grid 602, but the components have been configured to split the two parts of the operation across these two computers 604 and 606, e.g., in the manner set forth above. This may be to spread load, run a part of it on cheaper hardware, to reduce the funneling problems discussed, above, or any other reason.

There is also a box 608 with both an extractor and an accumulator in it. This shows an example situation where both activities are configured to run in the same computer.

Recall boxes also are shown. The recall process also may be distributed, e.g., using techniques similar to those described above. The opposite of accumulation is to read data back from the archive. For example, much like the extract-recall peers process described above, such a process may be configured to run in one computer, and the opposite of extraction (e.g., to put data back into its original form) may be configured to run on another computer. Again, this may be for load balancing purposes, or some other reason. Recall, for instance, may be used to retrieve any data that has been archived, or any subset of data that has been archived. In this regard, certain example embodiments may enable a user to be selective about the data to be recalled (e.g., to filter what is retrieved based on user-specified and/or predetermined criteria). It will be appreciated that one recall component is shown to be active in the same computer (overlaid onto) as an extractor, showing the activities are not necessarily mapped one-to-one with a particular computer. In other words, a recall computer 610 may operate alone, or a computer 612 may perform both extract and recall operations, etc. Even though a computer 612 may perform both extract and recall operations, the same computer 612 may perform extract operations and rely on another computer 622 for accumulate operations. Options may be set to specify this optional peer mapping. Other options may include, for example, the scope of the data to be recalled (e.g., the entire data entry, portions of a single entry, portions of an entry that have changed since a specified or predetermined time, etc.), where the data is to be recalled, what (if anything) is to happen to the data in the source (e.g., whether it is to be deleted, maintained, flagged as recalled, etc.), and/or the like. In view of the above, it will be appreciated that recall may be paired in reverse to the pairing of extract and accumulate and, thus, may in certain example embodiments have the same scope for parallel activity.

Archive searches also may take place using various computers in the network. In the FIG. 6 example, computers 614 and 616 are used for searching. Again, there is fine control over where these searches execute, e.g., subject to access to the relevant storage media.

Verification activities also may take place. And again, they may be configured such that they run on computers 618 and 620, e.g., where they are needed to be run from, where it is desirable to run them from, etc.

As will be appreciated from FIG. 6, the archiving techniques of certain example embodiments may involve a collection of many different activities. Each such activity may be made into a component that lives within a framework of collaborative components. These collaborative components, in turn, may be scheduled to run across a heterogeneous enterprise network of any scale, e.g., to achieve a distributed archive solution.

Although the term "paired" is used to describe the relationships among and/or between certain activities and/or components, it will be appreciated that the example embodiments disclosed herein are not limited to strict one-to-one mappings. Indeed, in certain example embodiments, it is possible to provide an n-to-m mapping between activities and/or components. For instance, extractors may extract data from one or more source stores, accumulators may accumulate data from one or more extractors and/or provide data to one or more target stores. Similar configurations also are possible in connection with recall, verify, and/or other activities and/or components or peripherals in certain embodiments of this invention. Furthermore, it will be appreciated that one or more brokers may be used to mediate communications in n-to-m mapping implementations in certain example embodiments, although other transport mechanisms also are possible. Similarly, it also may be possible to implement cloud computing in connection with different example embodiments so as to provide a highly distributed but controllable way to perform the above-described and/or other archiving operations. Indeed, cloud computing may in certain example instances help reduce the need for the funneling approach to archiving.

Example Data Loss Detection Systems and Methods

In addition to, or in place of, the above-described distributed archiving techniques, certain example embodiments also relate to data loss detection techniques. Archiving systems typically need to accommodate data over many years, and sometimes even decades. There are various studies that show that the vast majority of data in the archive is never referenced after the moment it is filed to the time it expires. However, all of the data in the archive typically must remain accessible, just in case it is needed prior to its expiry, as there often is no way to completely predict which data will be needed and which not. If it were possible to predict the data that would be needed with absolutely accuracy, then only a tiny portion of data would need to be archived in the first place. In reality, legislation and/or business compliance requirements often demands that all data is kept just in case it is needed (e.g., to resolve a future legal dispute, for example). Therefore, if any individual piece of data in the archive is likely not to be touched for years or even decades, the possibility exists that the media on which some or all of the data is stored could be lost, damaged, corrupted, etc., at any time. Such damage or loss ordinarily would go undetected until the moment when the individual data is needed.

Most current products are designed to protect the underlying data from being stolen, altered, or otherwise manipulated. Encryption and other security techniques very often are used to accomplish these ends. Unfortunately, however, these security measures do not protect again loss or damage and instead focus on the possibility of theft. The fact the data in the archive may have been encrypted is largely irrelevant in the case of damage or loss, as the problem is that it is gone or damaged and not illegally accessed. In other words, there exists a need to provide data integrity in addition to data security. Current archiving approaches are not designed to repeatedly verify data in the archive remains valid. Consequently undetected data loss can occur, thereby rendering content in the archive incomplete or useless. Many products tend to focus on encryption (which can easily be performed by hardware) rather than proactive detection of loss.

Loss or damage to data or the media on which it is stored can happen. The problem with archived data is that one typically does not know about it until it is too late. Generally speaking, there is some sort of "incident" that happens when data loss occurs (e.g., hardware damage such as DVD or other storage media being broken or simply lost, software failure, power outage, etc.), and with this there may be some kind of incident report made. However, if the loss involves data that has not been used for some time (e.g., days, months, years, etc.), then there may be no apparent commercial damage or risk. In addition, incident reports themselves become outdated over time, but the related data that is lost or damaged is not outdated and may be needed at any known or unknown time, e.g., during a search of the archive in the future.

Damage/loss of data cannot be absolutely prevented in all situations. One challenge for archives is to provide the earliest possible warning that something has happened. The sooner this alert happens, the more likely it is that something can be done to address the incident. Therefore, there is a need to provide a warning when potentially important data becomes unreachable, unusable, etc., so that something can be done about it according to rules for the particular data.

Many archiving systems (backed up by hardware) provide encryption of archived data. Encryption essentially is a means to protect against theft. Although encryption often is desirable, it still may provide an incomplete solution, as encryption does not protect against loss. A more proactive guard against data loss is needed to make sure an early warning mechanism is raised at the soonest possible time (e.g., automatically without direct human interaction), rather than leaving it until it is too late (e.g., when data is needed after the incident of loss or damage but cannot be obtained).

Certain example embodiments relate to a technique that may be used to perpetually or regularly access some or all data in the archive to make sure that it remains usable, constantly or substantially constantly over a short period of time (e.g., relative to the time data spends in the archive). Where loss or problems are discovered, an alert may be raised to make sure attention is drawn to the situation at the soonest possible point rather than when it is too late.

Figure 7:
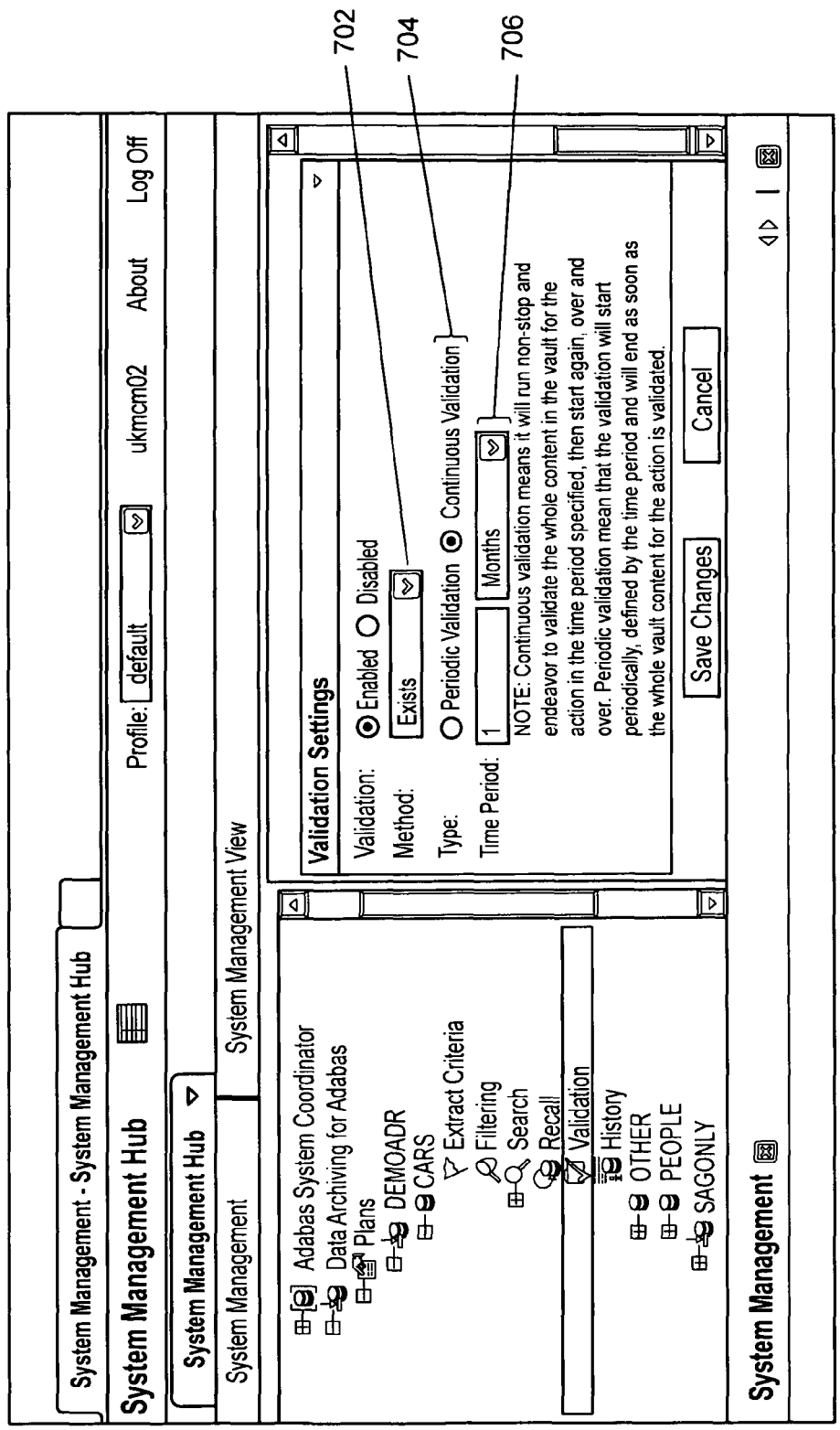
FIG. 7 is an illustrative screenshot showing certain parameters that may be used to perform data verification/integrity checks in accordance with an example embodiment.

In this regard, FIG. 7 is an illustrative screenshot showing certain parameters that may be used to perform data verification/integrity checks in accordance with an example embodiment. An authorized user may select the type of verification check to be initiated, e.g., by selecting an option from the dropdown list 702. Examples may include, for example, Exists—where the validation simply checks to see that the data is correctly listed as being present in the file system or other storage location, and can be opened or otherwise accessed;

Checksum—where the data is actually read and checksums or the like are checked for correctness; and/or Recallable—where the data is processed through a full simulation up to the point of recall to show it can be returned to the current system intact.

The levels of checking identified above imply greater and greater levels of overhead. Thus, it will be appreciated that other types of validation may be performed as necessary, e.g., depending on the sensitivity of the data. Indeed, the decision of which check to use generally involves a cost assessment that each business make according to the value and importance of the data being checked. Very simple checks such as if (for example) the file(s) can be seen in a list can be performed, or the validation may be set to go further to, for example, actually check to make sure that the file(s) can be opened. More choices also are possible up to and including the point where the whole of the data can be read and understood, checking checksums, etc.

Further control may be provided over when validation takes place, e.g., using the validation type and/or frequency options 704 and/or 706. One example involves the validation processor running continuously, validating the whole archive content within a given time period, at which point it starts all over again. This implies that the validation must run more intensively as the archive grows in order to check the whole within the specified period. In the FIG. 7 example, a continuous validation of the whole archive content is to be performed every month. The result is that data loss will be detected within 1 month from the point it is lost, no matter how old the data is at the time the loss occurs. By saying the whole content is to be checked every month, an implied level of "pacing" may automatically be determined by the archive system, e.g., based upon the total amount of data in the archive (for the particular data in question). Consequently, provided enough time is allotted, this technique will trickle along in the background without causing disruption to the surrounding computing resources. In certain example embodiments, it may automatically restart, e.g., in the case of intentional, accidental, or other interruption. Also, if the process calculates that it is not possible to check all of the content in the time allotted, then an alert may be raised so that the process may be stretched out more, or moved to a faster computer. The decision whether to use continuous versus periodic checking may be a choice reserved for the business. Although there is a difference in processing strategies, there may be no real difference in the underlying desire to detect loss at an early opportunity. Some users may find desirable the idea of the checker running constantly, e.g., as a trickle in the background, whereas other users may want the checker to run at specific times within a specified time period. Still others may even wish to have checking performed manually (e.g., such that a user specifically requests that a verification process begins) in place of, or in addition to, automatic verifications.

Another example involves the validation processor running periodically (e.g., weekly, bi-weekly, etc.), which will cause it to run to completion as soon as possible from the point it begins. In a bi-weekly periodic check, any data loss will be detected within 2 weeks from the point that it is lost, no matter how old the portion of data that is lost has become. Again, the time period between one run versus the next gives an implied pacing so that alerts can be given where necessary.

Figure 8:
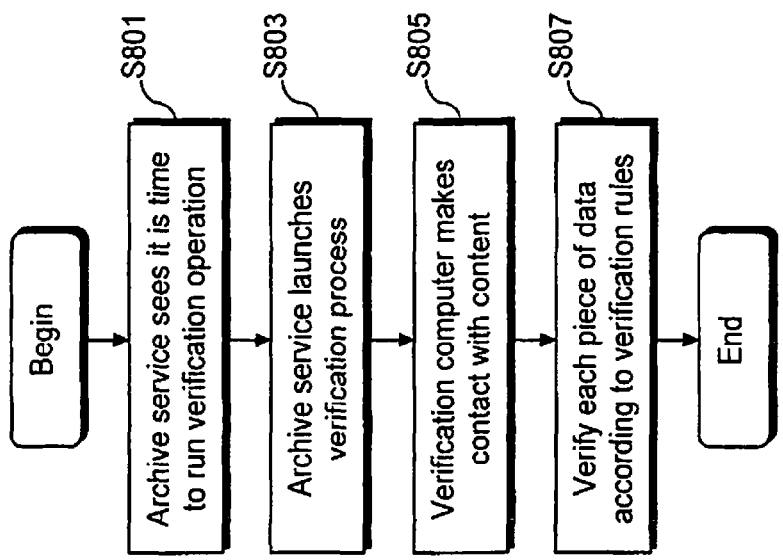
FIG. 8 is a flowchart showing an illustrative for process for performing a verification operation in accordance with an example embodiment.

FIG. 8 is a flowchart showing an illustrative for process for performing a verification operation in accordance with an example embodiment. In step S801, the archive service in the validation computer sees that it is time to run a validation operation, according to the schedules laid out. In step S803, the archive service launches a validation process. The validation process then makes contact with the archive content, piece by piece in step S805, e.g., after having used the archive infrastructure to determine where the archive is located. Each piece is processed in step S807 according to the level of checking and overhead to be borne. As indicated above, the level may be simply open the data pieces (e.g., touch it), reading it and validating internal checksums, processing the piece to the point at which it is known it could be fully recalled if necessary, etc.

During this process, progress information may be provided to the local archive service. The administrator may use the UI to monitor the verification processing, with graphical display of progress-to-date. In certain example embodiments, when a problem is detected, an alert may be raised as noted above. This alert may involve the generation of an email, text, or other message for an authorized person, an audible alarm, etc. In certain example embodiments, when a problem is detected, an attempt may be made to automatically try to repair, replace, or otherwise fix the problem.

Example Data Recovery Systems and Methods

In addition to, or in place of, the above-described distributed archiving techniques, certain example embodiments also relate to data recovery systems and/or methods. From the point in time when a business invests in archive systems for their databases and other systems, it is possible to have a well-organized professional archive service for operations moving forward. However, there still is a need to deal with data that was previously set aside in a form that is non-consumable by normal business applications. For example, a company may have been keeping backups of data for recovery purposes for a long time but not necessarily for archiving purposes. Such data typically is not consumable by applications and/or archive systems. Such data may be in a format or on media (e.g., such as on a backup tape) that renders it non-consumable by business systems. Thus, there is a need in the art for systems and/or methods for an archiving system to "travel back in time" into non-consumable data (e.g., in old archives and/or other unstructured forms) in order to move that data into the new, well-managed system. This advantageously allows the new archive system to embrace and acquire data that pre-dates the commissioning of the new archive system. The result is that a company can retrospectively increase the scope of the new archive system, effectively making it go back in time. This also can allow companies that were previously non-compliant to catch-up on old data in addition to data originating on or after the commissioning.

Consider the following example scenario. A company has never formally archived most data. Now, assume that the company's auditors inform the company that it is non-compliant for some or all of their data. Also assume that the company acquires a new archiving product. Consequently, from today they can become compliant. However, for years, the non-compliance problem remains. Although the company may have old database backups, they nonetheless likely are not easily consumed by business systems, span multiple versions of the legacy database system software and thus are not easy to restore to a consumable form (if possible at all), largely out of step with the present business systems because new fields appear in the modern data of today, or fields in the old data no longer exist, or the format/length etc of data has changed over time, etc. What is needed is for the new archive system now in place to be able to mine the old data and scrape out what is relevant to the old archive system and copy it into the new archive system (e.g., duly dated with past dates) so that the archive system essentially goes back in time, from day one rather than only forward in time from day one.

Current archiving approaches typically are not designed to acknowledge and acquire copies of data that pre-date the introduction of the new archiving system that only exists in non-consumable forms. This implies that companies must find a way to manage two different archiving systems, or suffer being non-compliant on old data, for as long as the older data remains within its active information life cycle management (ILM). These types of archive systems therefore are limited in their effectiveness until time moves forward significantly, e.g., to the point where the old data is no longer needed, potentially need, or relevant.

The inventor of the instant application has realized that it would be desirable if modern archiving systems for database and other data stores were capable of going back through old copies of data (e.g., in different forms to the current version that are not consumable by application systems) in order to import them into the modern archive. The ability to do so would increase the effectiveness of the modern system from the first day it is adopted. This essentially implies that the new archiving system can go back in time to record relevant information, even though it currently is a non-consumable form. This allows previous (usually informal and disorganized) archive or backup systems to be immediately retired in favor of the new well-managed toolset.

For example, assume that from today the new toolset will take care of all archiving, going forward. However, the backup data that pre-dates today's implementation of the new archiving system may still be needed in archive terms, even though it has been accumulated by means other than the new toolset. The old data may have been backed up using a utility, for instance. Certain example embodiments, however, enable the new toolset to access these non-standard forms of data and acquire older archive data, essentially forcing the new toolset back in time, increasing the value of the archive immensely, etc., which helps the company and the customers it serves.

Figure 9:
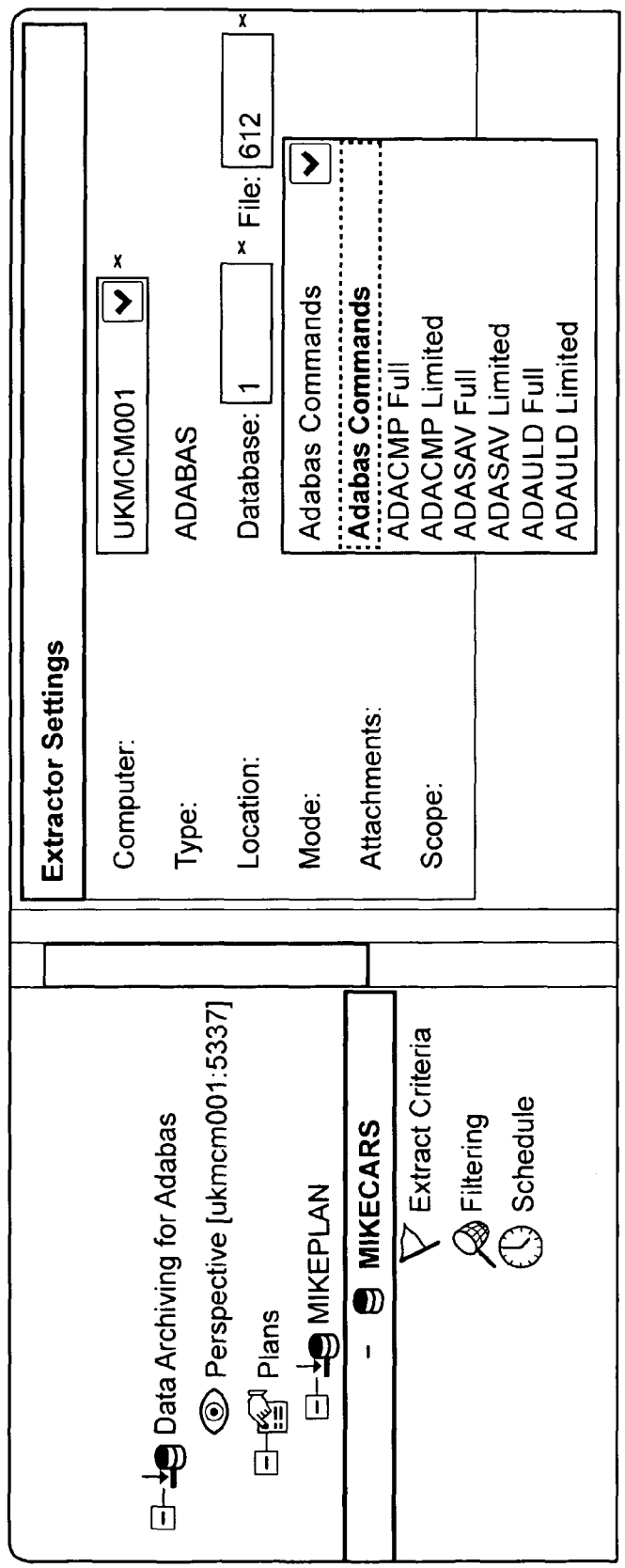
FIG. 9 is an illustrative screenshot showing certain parameters that may be used to restore data to a previous point in time in accordance with an example embodiment.

FIG. 9 is an illustrative screenshot showing certain parameters that may be used to restore data to a previous point in time in accordance with an example embodiment. Rather than acquiring data from the live source, FIG. 9 presents options for acquiring data from other sources. For example, old or deprecated backups may be selected and read so that non-consumable data from the past can be acquired seamlessly in the new archive system. The modern archive system may therefore be able to propel itself back in time, thereby massively increasing the scope of the new system from day one, rather than having it only increase in value slowly over time going forward. In the FIG. 9 example, the dropdown list includes various known ADABAS utilities including ADASAV (a backup utility), ADACMP (a compression utility), ADAULD (an unload utility), etc. Using the techniques of certain example embodiments, programs may be written or predefined to acquire data from these and/or other outputs, as such data may be provided in a known but proprietary (and therefore potentially not generally consumable) format.

Where these additional forms of data are well-known, such as database utility output, then the data can be processed predictably. However, this can be extended into forms of data that are unknown, by offering rule-based mining of the data so that a business can influence the acquisition of these data forms directly when they are not as well-known. In other words, rules for reacquiring data may be specified, e.g., using company-based knowledge, whereas that knowledge may not be known to the new archive system itself prior to the specification of such rules. In certain example embodiments, these rules may describe, for example, an interchange to take place between programs specially developed to access the specially formed data as a whole and/or to present the actual application data to the archive system with an accompanying metadata description. This interchange may be adapted to a particular database system type, or it may be a form that is specific only to the site. In certain example embodiments, it may be desirable to store the data in a format so that it can be later extracted in the original format and/or a consumable format, reformatted, etc. It will be appreciated that if the data is extracted from a known database backup, then the data may be manageable as though it came from that database type in the first place and can from that point be recalled to that form directly if needed.

Figure 10:
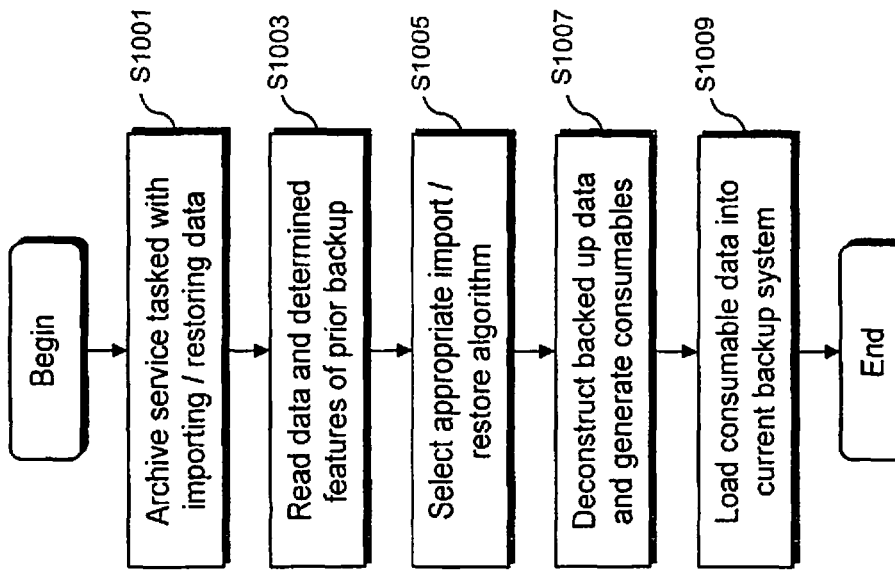
FIG. 10 is a flowchart showing an illustrative for process for restoring data to a previous point in time in accordance with an example embodiment.

FIG. 10 is a flowchart showing an illustrative for process for restoring data to a previous point in time in accordance with an example embodiment. The archive system (or an importing/restoring module or service thereof) is tasked with restoring or importing a database or data store backup from a point in time in the past in step S1001. This database may be an ADABAS database, a SQL database, a series of flat files, files backed up using a utility, etc. In step S1003, the new archive system reads the backup data and works out the architecture, platform, version, and/or any other information that may be relevant, regarding the backed up data and/or how it was backed up. This may be aided, for example, by having a user specify such information or at least telling the archive system where to look to determine this information. Once this background information is identified, in step S1005, the new archive system may choose the appropriate algorithm by which it can deconstruct the proprietary data into a consumable form. The algorithm may be user-specified or user-programmed, manually or automatically selected from a list of predetermined algorithms, automatically generated based (e.g., based on discovered data and/or user specified information), etc. The data is deconstructed in step S1007, and then the consumable data is loaded into the archive in step S1009 as though it was archived in the normal way back in time. This may be accomplished using predefined algorithms where the old system or tool is known, using user-specified algorithms, or some combination of therebetween. There are, of course, well-known contents for database backups, etc., for example, and algorithms may exist or be fashioned for these and/or other operations. In certain example embodiments, the data newly added to the archive may be tagged to indicate that it was imported in this manner (e.g., for future audit purposes). Optionally, in one or more steps not shown, fields that should or should not be written to the archive may be filtered, e.g., as directed by the archive system administrator.

Although certain example embodiments have been described as relating to past systems, the "restoring" features of the example archive system described herein may be used to "import" data. For example, such importing techniques may be used for disparate systems that are used in the past, in parallel with other systems, and/or for archive systems that are implemented after the archive systems of certain example embodiments is implemented. In fact, in certain example implementations, this sort of importing may be used as the "normal" means of archiving.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium. Different example embodiments may involve heterogeneous networks (e.g., where there are at least two types of computers and/or peripherals connected to the network), or homogenous networks (where there is a single common type of computer and/or peripheral).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An archival system, comprising:
a plurality of computers connected to a network;
at least one source data store and at least one target data store connected to the network; and
at least one archive service configured to coordinate a plurality of extract operations with a plurality of accumulate operations, each said extract operation being executed on one said computer in the plurality of computers to read data from one said source data store and each said accumulate operation being executed on one said computer in the plurality of computers to write data to one said target data store,
wherein each said extract operation is configured to run on a first computer in the plurality of computers and is paired with one said accumulate operation that is configured to run on a second separately located computer, different from the first computer, in the plurality of computers,
wherein the at least one archive service is further configured to implement extract rules identifying data to be read from the at least one source data store and identifying whether a schema for the at least one source data store is to be attached to the data to be read, and
wherein the at least one archive service is further configured to coordinate at least one validation operation to repeatedly verify integrity of data stored in the at least one target data store, and when the validation operation(s) determine(s) that data stored in the at least one target data store lost integrity, to perform an operation on the data with lost integrity based on rules associated with the data.

2. The archival system of claim 1, wherein the at least one archive service is further configured to access rules (a) mapping the extract and accumulate operations to respective computers on which the operations are to be executed, and (b) storing pairings between peer extract and accumulate operations.

3. The archival system of claim 2, wherein the rules further identify at least one said source data store for each said extract operation and at least one said target data store for each said accumulate operation.

4. The archival system of claim 3, wherein the rules further include accumulate rules indicating how duplicate entries are to be handled and/or how long data is to be retained in each said target data store.

5. The archival system of claim 3, further comprising a configuration server in communication with the at least one archive service, the configuration server including the rules.

6. The archival system of claim 5, further comprising an administrative user interface in communication with the configuration server and/or at least one archive service for setting the rules and/or monitoring progress of the operations.

7. The archival system of claim 3, wherein one said target data store is a vault that is accessible only in part by each said computer.

8. The archival system of claim 3, wherein the system is arranged such that a central hub or funnel is not used when data is written to the at least one target data store.

9. The archival system of claim 3, wherein the at least one archive service is further configured to coordinate at least one recall operation to retrieve data from the at least one target data store for access on a computer of said plurality of computers.

10. The archival system of claim 9, wherein the at least one recall operation is further configured to place the retrieved data from the at least one target data store into at least one said source data store.

11. The archival system of claim 1, wherein the at least one validation operation is configured to run continuously for a predetermined amount of time.

12. The archival system of claim 1, wherein the at least one validation operation is configured to run periodically such that the at least one validation operation begins execution at predetermined times or time intervals.

13. The archival system of claim 1, wherein the at least one validation operation is configured to determine whether data exists, matches a checksum, and/or is recallable, based on predetermined rules accessible by the at least one validation operation.

14. The archival system of claim 13, wherein the at least one validation operation is further configured to raise an alarm if the at least one validation operation encounters a fault during execution.

15. The archival system of claim 3, wherein the at least one archive service is further configured to coordinate at least one importing operation to incorporate data from an otherwise non-consumable backup location into the at least one source data store and/or the at least one target data store.

16. The archival system of claim 15, wherein the at least one importing operation is configured to determine (a) what data exists in the data from the otherwise non-consumable backup location was backed up, and (b) how the data from the otherwise non-consumable backup location was backed up.

17. The archival system of claim 16, wherein the at least one importing operation implements rules for reacquiring the data from the otherwise non-consumable backup location, the rules for reacquiring the data being one or more user programmed rules, one or more predefined algorithms, and/or automatically generated by the at least one importing operation.

18. A method implemented using a plurality of computers connected to a network for storing data in an archival system, the method comprising:
enabling at least one source data store and at least one target data store connectivity to the network;
enabling at least one archive service on one or more of said computers, the at least one archive service being configured to interface a plurality of extract operations with a plurality of accumulate operations, each said extract operation being configured to run on a first computer in the plurality of computers, and to coordinate at least one validation operation to repeatedly verify integrity of data stored in the at least one target data store;
pairing each said extract operation with one said accumulate operation, each said accumulate operation being configured to run on a second separately located computer, different from the first computer, in the plurality of computers;
implementing defined extract rules (a) identifying data to be read from the at least one source data store and (b) identifying whether a schema for the at least one source data store is to be attached to the data to be read,
wherein each said extract operation is executable on one said computer in the plurality of computers to read data from one said source data store and each said accumulate operation is executable on one said computer in the plurality of computers to write data to one said target data store; and
when the validation operation(s) determine(s) that data stored in the at least one target data store lost integrity, performing an operation on the data with lost integrity based on rules associated with the data.

19. The method of claim 18, further comprising:
mapping the extract and accumulate operations to respective computers on which the operations are to be executed; and
storing pairings between peer extract and accumulate operations.

20. The method of claim 19, further comprising identifying at least one said source data store for each said extract operation and at least one said target data store for each said accumulate operation.

21. The method of claim 20, further comprising defining accumulate rules indicating (a) how duplicate entries are to be handled and/or (b) how long data is to be retained in each said target data store.

22. The method of claim 20, further comprising providing a configuration server in communication with the at least one archive service, the configuration server having access to rules describing the mapping, the pairing, the at least one said source data store identified for each said extract operation, and the at least one said target data store identified for each said accumulate operation.

23. The method of claim 22, further comprising providing an administrative user interface in communication with the configuration server and/or at least one archive service for setting the rules and/or monitoring progress of the operations.

24. The method of claim 20, wherein one said target data store is a vault that is accessible only in part by each said computer.

25. The method of claim 20, wherein the operations are performed without resort to a central hub or funnel.

26. The method of claim 20, wherein the at least one archive service is further configured to coordinate at least one recall operation to retrieve data from the at least one target data store for access on a computer of said plurality of computers.

27. The method of claim 26, wherein the at least one recall operation is further configured to place the retrieved data from the at least one target data store into at least one said source data store.

28. The method of claim 1, wherein the at least one validation operation is configurable to run continuously for a predetermined amount of time.

29. The method of claim 1, wherein the at least one validation operation is configurable to run periodically such that the at least one validation operation begins execution at predetermined times or time intervals.

30. The method of claim 1, wherein the at least one validation operation is configurable to determine whether data exists, matches a checksum, and/or is recallable, based on predetermined rules accessible by the at least one validation operation.

31. The method of claim 30, wherein the at least one validation operation is further configurable to raise an alarm if the at least one validation operation encounters a fault during execution.

32. The method of claim 20, wherein the at least one archive service is further configured to coordinate at least one importing operation to incorporate data from an otherwise non-consumable backup location into the at least one source data store and/or the at least one target data store.

33. The method of claim 32, wherein the at least one importing operation is configurable to determine (a) what data exists in the data from the otherwise non-consumable backup location was backed up, and (b) how the data from the otherwise non-consumable backup location was backed up.

34. The method of claim 33, wherein the at least one importing operation implements rules for reacquiring the data from the otherwise non-consumable backup location, the rules for reacquiring the data being one or more user programmed rules, one or more predefined algorithms, and/or automatically generated by the at least one importing operation.

35. A non-transitory computer readable storage medium storing instructions that, when executed, cause a computer including at least one processor to perform features comprising:
  enabling at least one source data store and at least one target data store connected to a network;
  enabling at least one archive service on one or more computers connected to the network, the at least one archive service being configured to interface a plurality of extract operations with a plurality of accumulate operations, each said extract operation being configured to run on a first computer in the plurality of computers, and to coordinate at least one validation operation to repeatedly verify integrity of data stored in the at least one target data store;
  pairing each said extract operation with one said accumulate operation, each said accumulate operation being configured to run on a second separately located computer, different from the first computer, in the plurality of computers; and
  implementing defined extract rules (a) identifying data to be read from the at least one source data store and (b) identifying whether a schema for the at least one source data store is to be attached to the data to be read,
  wherein each said extract operation is executable on one said computer in the plurality of computers to read data from one said source data store and each said accumulate operation is executable on one said computer in the plurality of computers to write data to one said target data store; and
  when the validation operation(s) determine(s) that data stored in the at least one target data store lost integrity, performing an operation on the data with lost integrity based on rules associated with the data.

36. The archival system of claim 1, wherein the first computer and the second computer are components of a distributed computing system comprising the plurality of computers.

37. The archival system of claim 1, wherein the at least one archive service is configured so that data having a higher archive priority will be distributed to higher performance devices where data of a lower archive priority will be distributed to lower performance devices.

* * * * *